(No Model.)

E. WESTON.
ELECTRICAL MEASURING INSTRUMENT.

No. 600,981. Patented Mar. 22, 1898.

Witnesses
Edward L. Rowland
M. M. Robinson

Inventor
Edward Weston
By his Attorney
Charles J. Kintner

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 600,981, dated March 22, 1898.

Application filed December 7, 1897. Serial No. 661,098. (No model.)

*To all whom it may concern:*

Be it known that I, EDWARD WESTON, a subject of Her Majesty the Queen of Great Britain, residing at Newark, in the county of Essex and State of New Jersey, have made a new and useful Invention in Electrical Measuring Instruments, of which the following is a specification.

There are many places in the use of electrical measuring instruments where it is desirable to utilize two instruments at one and the same time, either for the purpose of measuring in one case the quantity of current and in the other the potential or voltage or for measuring independent quantities of current and independent voltages or potentials. It is also often desirable to combine two instruments of the character indicated upon a common support in a single inclosing case for the purpose of transportation or usage and with a view of making the entire structure as light and compact as possible—as, for instance, in connection with motor-vehicles and in such places where either continuous or successive transportation is often necessitated. I have also often found it to be desirable to make comparative readings upon independent instruments, either as to potential or quantity, and in such an event it is important to have the indicating-needles so located with relation to each other that instantaneous comparative readings may be made. It was with these several objects in view that the present invention was devised.

My invention will be fully understood by referring to the accompanying drawings, in which—

Figure 1:
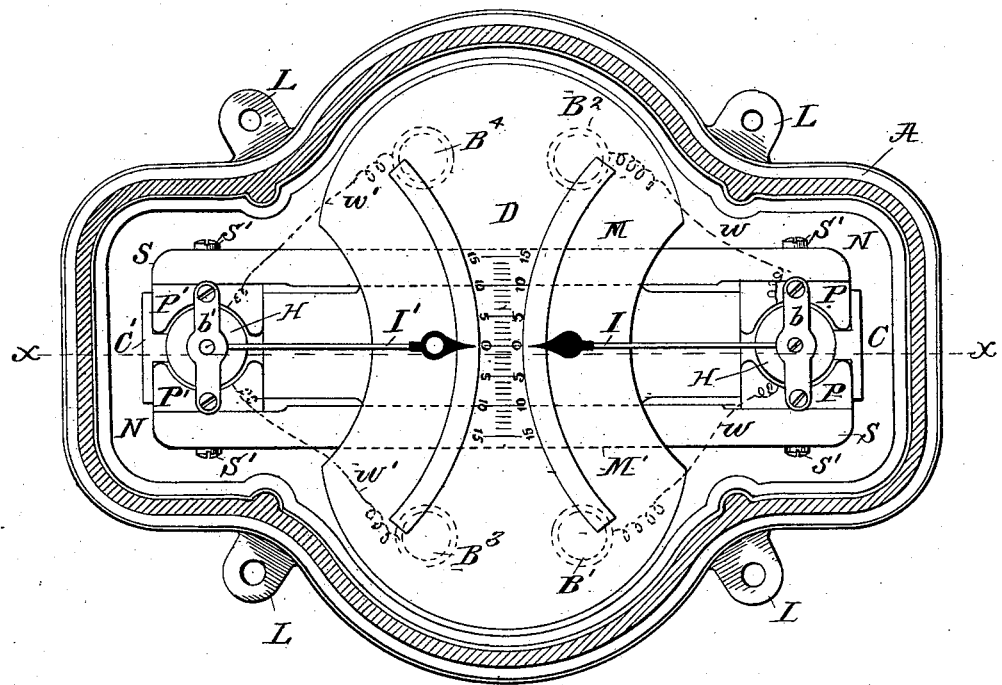
Figure 2:
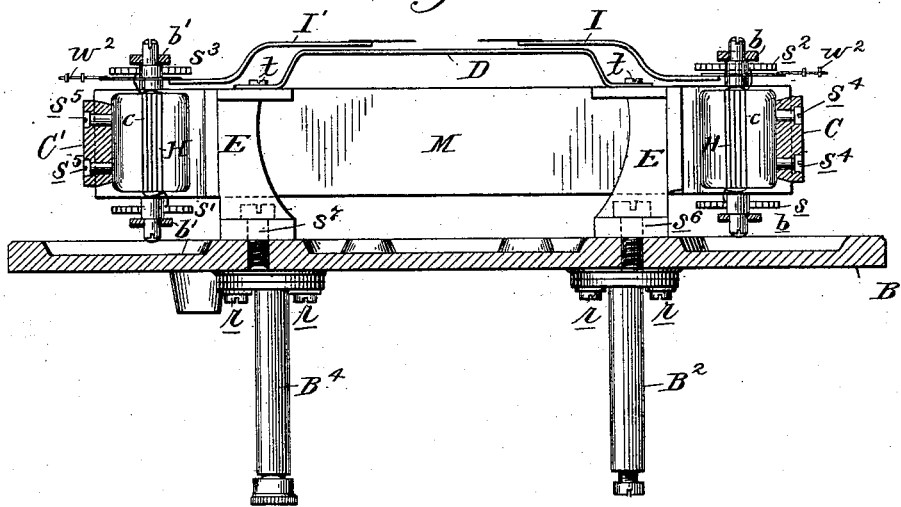

Figure 1 is a plan view of my novel compound instrument with the covering or casing removed, so as to disclose the entire interior structure, Fig. 2 being a sectional view thereof on the line $x\,x$, some of the parts being shown in elevational view.

Referring to the drawings in detail, B represents the base of the instrument provided with pairs of lugs or ears L L L L for securing it permanently in place.

E E are standards secured to the base B by screws $s^6\ s^6\ s^7\ s^7$.

M and M' represent permanent magnets with their poles oppositely located, as shown at N S N S, said magnets being supported by cross-bars, to which in turn is secured by screws $t\ t$ a dial-plate D.

P P P' P' are curved soft-iron pole-pieces secured thereto by screws S' S' S' S'.

H H represent soft iron cylinders secured to brass or other diamagnetic bars C C' by screws $s^4\ s^4\ s^5\ s^5$, said bars being in turn secured to the outer ends of the pole-pieces P P P' P', there being a sufficient space between the cylinders H H and curvilinear pole-pieces P P P' P' for the movement of movable coils $c\ c$.

$b\ b\ b'\ b'$ are pairs of bridges of diamagnetic material electrically insulated from but connected at their opposite ends by screws to the pole-pieces P P P' P', their function being to act as supports for the pivots of the movable coils $c\ c$.

I and I' are indicating-needles connected to the pivots which support the movable coils and provided with counterweights $w^2\ w^2$, $s\ s^2$ and $s'\ s^3$ being oppositely-disposed pairs of retractile springs connected also to the pivot-supports and the bridges $b\ b\ b'\ b'$ of the respective instruments and so adjusted that when there is no current passing through the movable coils the index-needles I and I' point, as shown, to the zero-points of independent scales upon the common dial-plate D. The movable coils $c\ c$ and their circuit connections through the pairs of retractile springs $s\ s^2$ and $s'\ s^3$ to the conductors $w\ w\ w^4\ w'$, and the manner of sustaining the soft-iron or other magnetic cylinders H H by means of screws $s^4\ s^4\ s^5\ s^5$ upon diamagnetic bars C C, together with the curved pole-pieces P P P' P', are fully described in my prior United States patents, No. 392,387, granted November 6, 1888, and No. 446,489, granted February 17, 1891, and need not be further referred to here.

B' B² B³ B⁴ are pairs of binding-posts connected, respectively, to the conductors $w\ w\ w'\ w'$, running to the movable coils and movable parts of the two independent instruments, said binding-posts being secured to the under side of the base or support B by pairs of screws $r\ r\ r\ r$.

In the present instance I have illustrated the indicating-needles I and I' as being oppositely disposed with relation to a common scale calibrated alike on opposite sides, thus indicating that the instruments are both voltmeters or ammeters, as the case may be. It is obvious that one of the instruments—for instance, the one having the needle I—might have its scale calibrated to measure the quantity of current, while the instrument having the indicating-needle I' might have its scale calibrated to indicate the voltage or potential. It is apparent that the disposition of the indicating-needles I I' in the manner shown in connection with a common scale renders it an easy matter to make comparative readings where two instruments are attached to a single base or inclosed in one casing, and this by reason of the fact that the calibrations are extended laterally in parallel lines to points approaching the arcs of the swinging index needles or hands, as clearly shown in Fig. 1 of the drawings.

I believe that it is broadly new with me to thus rigidly combine two electrical measuring instruments having a common scale in such manner that the readings thereof may be observed at one and the same instant, and my claims are generic as to this feature.

I believe it is also broadly new with me to combine the movable parts of two current-measuring instruments with a single pair of magnets, so as to afford or offer substantially constant magnetic fields to such movable parts, and my claims are to be construed also as generic in this particular.

Having thus described my invention, what I claim, and desire to secure by Letters Patent of the United States, is—

1. Two current-measuring instruments attached to a single or common base and having their indicating-needles so located with relation to a common scale that independent readings may be taken at the same instant, substantially as described.

2. Two current-measuring instruments attached to a single or common base, in combination with a single dial-plate provided with a scale common to the index-needles of both instruments, substantially as described.

3. Two current-measuring instruments each provided with an index needle or hand operatively connected with the rotary or movable part of its own instrument, said rotary or movable parts being located in the magnetic fields between the opposite ends of a pair of energizing-magnets, substantially as described.

4. Two current-measuring instruments attached to a common base with their movable parts located in the magnetic fields between the opposite ends of two magnets, in combination with index needles or hands and a single dial-plate provided with one or more scales toward which both of said index-hands point during their entire range of movement, substantially as described.

5. A combined instrument for measuring electrical currents, consisting of two instruments inclosed in a single casing and a single dial-plate having a scale common to the movable parts of said instruments, substantially as described.

6. A pair of electrical measuring instruments having movable index needles or hands normally pointing toward each other, in combination with an intermediate dial-plate and a scale calibrated alike for both instruments, the calibrations of said scale extending in lines parallel with the normal position of the index-needles and to points substantially equally distant from said needles for all ranges of movements, substantially as shown and described.

7. A pair of electrical measuring instruments having each a movable index needle or hand, in combination with a single scale located between said needles or hands, the calibrations of said scale extending to points substantially equally distant from the ends of the needles for all ranges of movement thereof, substantially as described.

8. Two electrical measuring instruments having movable index needles or hands I and I' attached to movable coils $c$ $c$ located in the magnetic fields between pole-pieces P P P' P' secured to the ends of permanent magnets M and M', in combination with a dial-plate D having an intermediate scale common to both index needles or hands, and independent binding-posts $B'$ $B^2$, $B^3$ $B^4$ having circuit connections with the movable coils, all of said parts being rigidly attached to a common base or support, substantially as described.

In testimony whereof I have hereunto subscribed my name this 2d day of December, 1897.

EDWARD WESTON.

Witnesses:
C. J. KINTNER,
JOHN C. YOUNG.